(12) United States Patent
Rask et al.

(10) Patent No.: US 7,559,394 B2
(45) Date of Patent: Jul. 14, 2009

(54) ENERGY RECOVERY SYSTEM

(75) Inventors: Rodney B. Rask, Grosse Pointe Woods, MI (US); Sherif H. El Tahry, Troy, MI (US); Paul M. Najt, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 419 days.

(21) Appl. No.: 11/378,721

(22) Filed: Mar. 17, 2006

(65) Prior Publication Data

US 2007/0215396 A1 Sep. 20, 2007

(51) Int. Cl.
| | |
|---|---|
| *B60K 3/00* | (2006.01) |
| *B60K 11/00* | (2006.01) |
| *B60K 1/00* | (2006.01) |
| *B60K 6/00* | (2006.01) |
| *B60K 25/10* | (2006.01) |
| *B62M 1/10* | (2006.01) |

(52) U.S. Cl. ................ 180/165; 180/301; 180/302
(58) Field of Classification Search ............. 180/302, 180/301, 165
See application file for complete search history.

(56) References Cited

U.S. PATENT DOCUMENTS

| | | | | | |
|---|---|---|---|---|---|
| 2,916,098 | A | * | 12/1959 | Millar | 180/233 |
| 3,493,066 | A | * | 2/1970 | Dooley | 180/165 |
| 3,513,929 | A | * | 5/1970 | Kim | 180/302 |
| 4,336,856 | A | * | 6/1982 | Gamell | 180/165 |
| 6,311,486 | B1 | | 11/2001 | Negre et al. | 60/370 |
| 2002/0162698 | A1 | * | 11/2002 | Oglesby et al. | 180/301 |

OTHER PUBLICATIONS

Compressed Air Vehicles, "Running on Air", ft automotive Environment Analyst Issue 44, Sep. 1998, pp. 19-20.

* cited by examiner

*Primary Examiner*—Christopher P Ellis
*Assistant Examiner*—John R Olszewski

(57) ABSTRACT

A power system includes a device configured to store pressurized fuel. An air motor having an air motor output member is in fluid communication with the storage device, and is configured to transfer the mechanical energy of the fuel to the air motor output member. A chemical energy conversion system is in fluid communication with the air motor to receive fuel therefrom. The chemical energy conversion system is configured to convert the chemical energy of the fuel to another form of energy, such as mechanical energy or electrical energy. The power system of the invention recovers at least some of the energy expended in compressing fuel in the storage device

6 Claims, 2 Drawing Sheets

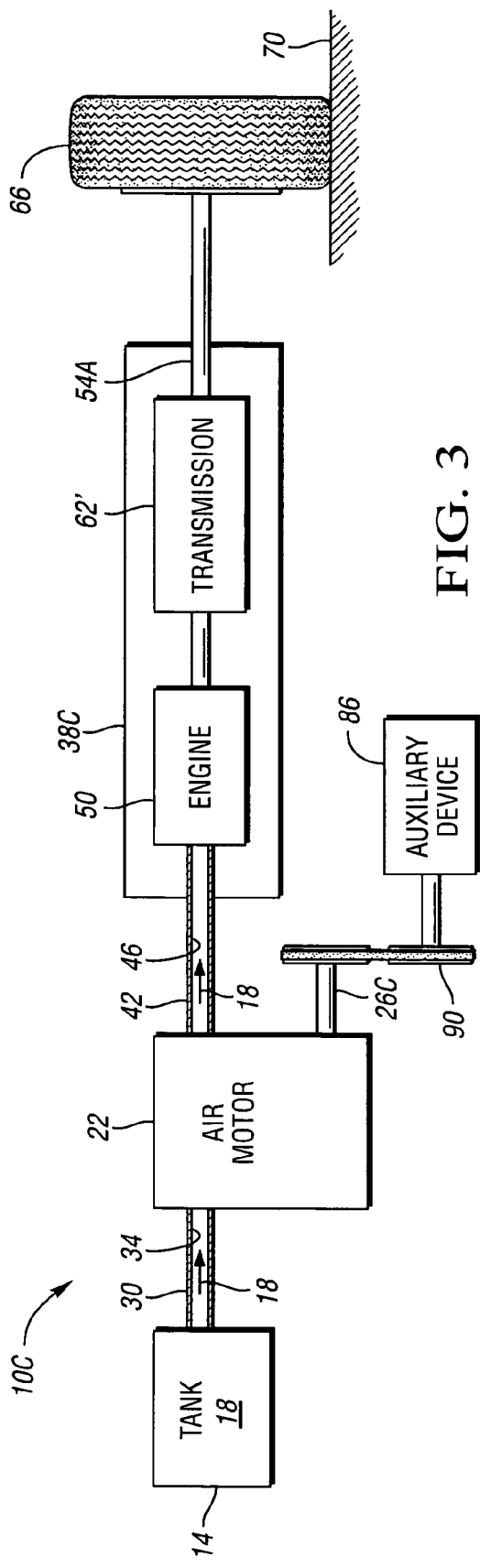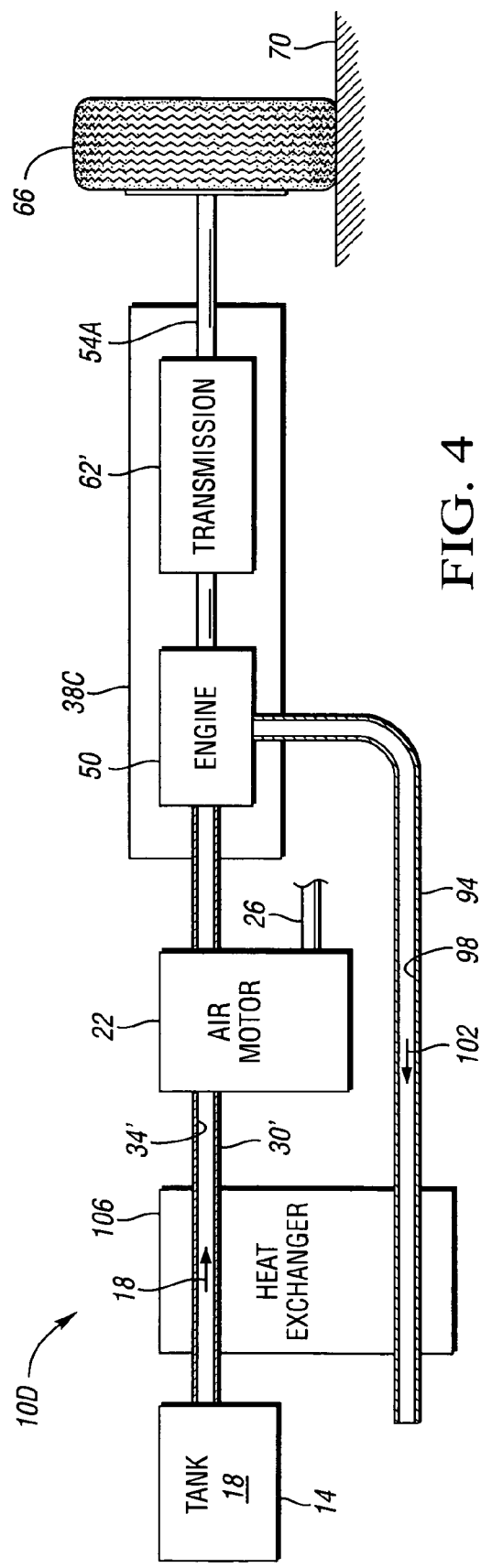

ENERGY RECOVERY SYSTEM

TECHNICAL FIELD

This invention relates to power systems that include a storage device to store compressed fluid fuel, an air motor to recover mechanical potential energy from the compressed fluid fuel, and a device to convert chemical energy of the fuel to another form of energy.

BACKGROUND OF THE INVENTION

A typical production automotive vehicle includes an internal combustion reciprocating engine that converts the chemical energy stored in a liquid fuel to mechanical rotational energy to drive the vehicle's wheels or other ground-engaging tractive device. Interest in the use of gaseous fuels in automotive vehicles is increasing. Gaseous fuels, such as compressed hydrogen and natural gas, have lower energy densities than liquid fuels at the same temperature and pressure. Accordingly, gaseous fuels are typically compressed for storage on board a vehicle in order to increase their energy densities to provide adequate driving range between refuelings. Energy must be expended in compressing a gaseous fuel for storage onboard a vehicle, increasing the cost of gaseous fuel and lowering the energy efficiency of a gaseous fuel distribution system.

SUMMARY OF THE INVENTION

A power system is provided that includes a device configured to store pressurized fuel such that the fuel includes mechanical potential energy and chemical energy. An air motor having an air motor output member is in fluid communication with the storage device, and is configured to transfer the mechanical potential energy of the fuel to the air motor output member. A chemical energy conversion system is in fluid communication with the air motor to receive fuel therefrom. The chemical energy conversion system is configured to convert the chemical energy of the fuel to another form of energy, such as mechanical energy or electrical energy.

The power system of the invention has improved efficiency compared to the prior art because the air motor recovers at least some of the energy expended in compressing the fuel in the storage device. The recovered energy may be combined with the work output of the chemical energy conversion system, or it may be used to power an auxiliary device. The power system may be a stationary power system, or may be part of the powertrain of a vehicle. Accordingly, a vehicle powertrain is also provided.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic depiction of another alternative powertrain in accordance with the claimed invention; and FIG. 4 is a schematic depiction of yet another alternative powertrain in accordance with the claimed invention.

DESCRIPTION OF THE PREFERRED EMBODIMENTS

Figure 1:
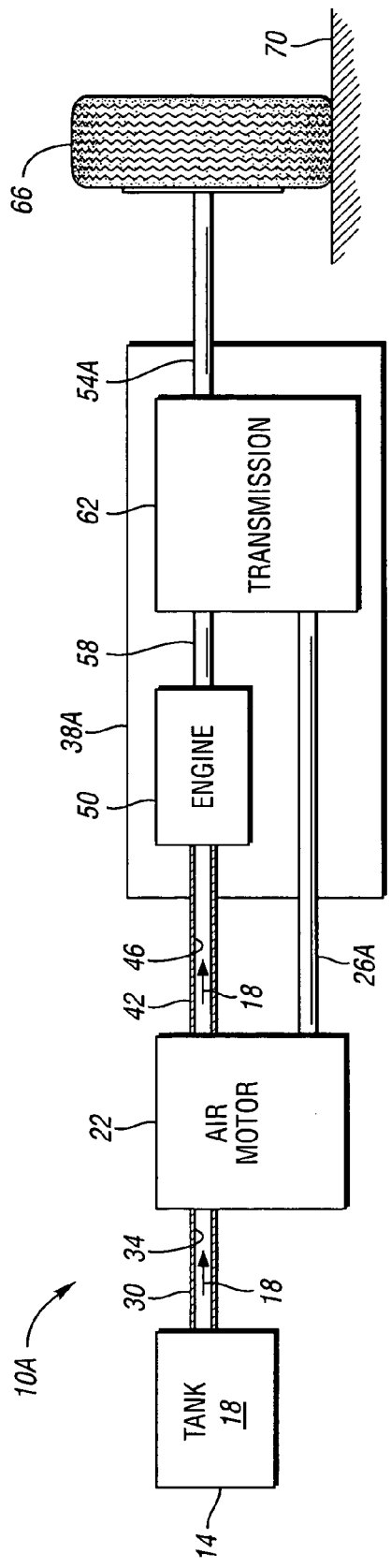
FIG. 1 is a schematic depiction of a powertrain in accordance with the claimed invention.

Referring to FIG. 1, an automotive powertrain 10A, or power system, is schematically depicted. The powertrain 10A includes a storage device, such as a tank 14, configured to store pressurized fluid fuel 18. The fuel 18 is preferably a compressed gas, such as methane or hydrogen. The fuel 18 in the tank 14 is characterized by chemical energy and, because it is at a higher pressure than the ambient atmospheric pressure, is characterized by mechanical potential energy.

An air motor 22 includes an air motor output member, such as a shaft 26A. The air motor 22 is in fluid communication with the tank 14 via a conduit 30 that defines a passageway 34, which conveys fuel 18 from the tank to the air motor. The air motor 22 is configured to transfer the mechanical energy of the fuel 18 to the shaft 26A. In the context of the claimed invention, an "air motor" is any device configured to transmit the mechanical energy, including mechanical potential energy, of a pressurized or flowing fluid to a solid object, e.g., by rotating the output member. In the devices shown in the Figures, mechanical energy is transferred to or through an output member by rotating the output member.

Those skilled in the art will recognize a variety of air motors that may be employed within the scope of the claimed invention. For example, the air motor 22 may be a turbine having blades that are connected to shaft 26A and that rotate in reaction to the flow of the pressurized fluid. Similarly, the air motor 22 may be of the reciprocating type wherein the pressure of the fluid causes the movement of a piston or pistons in single or multiple stages and, correspondingly, a crankshaft. Air motors do not convert chemical energy of the fluid to another form, but merely transfer the energy found in the pressure differential between a fluid and the ambient conditions, or the mechanical energy of a flowing fluid.

The fuel 18 exits the air motor 22 through a passageway 46 formed in conduit 42. Fuel 18 is at a lower pressure in conduit 42 than in conduit 30. A chemical energy conversion system 38A is in fluid communication with the air motor 22 via conduit 42 to receive fuel 18. The chemical energy conversion system is configured to convert the chemical energy of the fuel 18 to another form of energy. Those skilled in the art will recognize a variety of chemical energy conversion devices that may be employed within the scope of the claimed invention. For example, in the embodiment depicted in FIG. 1, the chemical energy conversion system 38A includes an engine 50 that converts the chemical energy stored in fuel 18 to mechanical energy through combustion. The engine 50 may be internal combustion or external combustion, and may be a turbine, a reciprocating engine, etc.

The chemical energy conversion system 38A includes a chemical energy conversion system output member, such as a rotatable shaft 54A. The chemical energy conversion system 38A is configured to convert the chemical energy of the fuel 18 to mechanical energy and to transmit the mechanical energy converted from the chemical energy to the shaft 54A. In the embodiment depicted, the engine 50 combusts the fuel to convert the chemical energy to mechanical energy. The mechanical energy is transmitted to a rotatable engine output member, such as a crankshaft 58, as understood by those skilled in the art. An engine output member, such as a crankshaft, is a chemical energy conversion system output member within the scope of the claimed invention. However, in FIG. 1, the crankshaft is operatively connected to a multi-speed transmission 62, and the shaft 54A is the output shaft of the transmission.

The shaft 54A is mechanically connected via a final drive system (not shown) to a wheel 66 that is engaged with the ground 70, i.e., the surface on which the vehicle is traveling, to rotate the wheel and thereby propel the vehicle as understood by those skilled in the art. In the embodiment depicted in FIG. 1, the air motor shaft 26A is sufficiently operatively connected to the wheel 66 to transmit mechanical energy thereto. More specifically, the air motor shaft 26A is operatively connected to the transmission 62, which transmits the mechanical power from the shaft 26A and the mechanical power from the crankshaft 58 to the output member 54A, such as by a differential gearset or other arrangement as understood by those skilled in the art.

Figure 2:
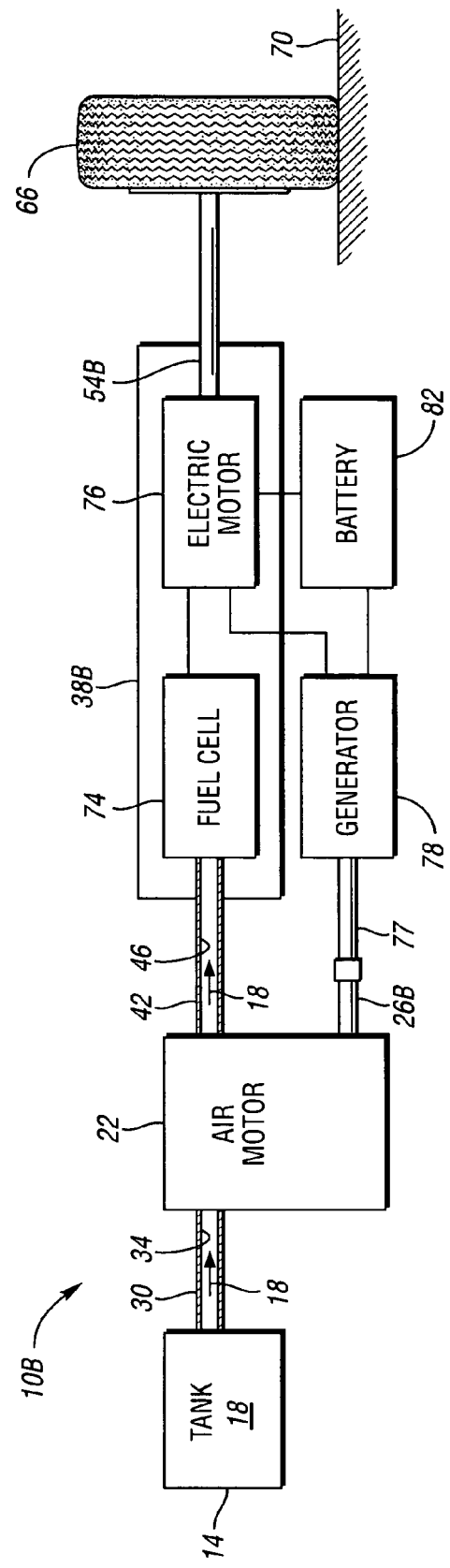
FIG. 2 is a schematic depiction of an alternative powertrain in accordance with the claimed invention.

Referring to FIG. 2, wherein like reference numbers refer to like components from FIG. 1, an alternative powertrain 10B is schematically depicted. Powertrain 10B is similar to powertrain 10A of FIG. 1, except that the chemical energy conversion system 38B includes a fuel cell 74 and an electric motor 76, and the output member of the air motor 22 is a shaft 26B that is connected to the rotor 77 of a generator 78 to selectively rotate the rotor 77.

The fuel cell 74 is in fluid communication with the air motor 22 via conduit 42 to receive fuel 18. The fuel cell 74, converts the chemical energy of the fuel 18 to electrical energy, as understood by those skilled in the art. The fuel cell 74 is in electrical communication with the motor 76, such as by conductive wires, to transmit the electrical energy thereto. The motor 76 converts the electrical energy from the fuel cell 74 to mechanical energy, which is transmitted to the rotor 54B of the motor 76. The chemical energy conversion system output member is the rotor 54B of the motor 76, and is mechanically coupled to the wheel 66 to transmit rotational mechanical energy thereto.

The rotation of the air motor shaft 26B causes the rotation of rotor 77, which in turn causes the generator to convert the mechanical energy from the shaft 26B to electrical energy, which may then be transmitted to the electric motor 76 to drive the motor rotor 54B, or may be transmitted to an electrical energy storage device 82, such as a battery or capacitor, for later use by the motor 76.

Referring to FIG. 3, wherein like reference numbers refer to like components from FIGS. 1 and 2, another alternative powertrain 10C is schematically depicted. Powertrain 10C is similar to the powertrain 10A of FIG. 1, except instead of the mechanical energy output of the air motor 22 going to the transmission 62', the air motor output shaft 26C is operatively connected to an auxiliary device 86 to supply mechanical power thereto via a belt drive 90. Those skilled in the art will recognize a variety of mechanical connections between output shaft 26C and an auxiliary device that may be employed within the scope of the claimed invention, such as a coupling, gearing, chain drive, etc. Exemplary auxiliary devices 86 include a generator to recharge a battery, a pump for power steering, a transmission pump, an air conditioning compressor, etc.

Referring to FIG. 4, wherein like reference numbers refer to like components from FIGS. 1-3, yet another alternative powertrain 10D is schematically depicted. The chemical energy conversion system 38C produces waste heat from the engine 50. A conduit 94 defines a passageway 98 for conveying a waste heat containing fluid 102 from the engine 50. The conduit 94 provides fluid communication between the engine 50 and a heat exchanger 106.

The heat exchanger is in thermal communication with the conduit 30' that conveys fuel 18 from the tank 14 to the air motor 22. More specifically, the heat exchanger 106 transfers heat from the fluid 102 to the fuel 18 in the conduit 30', thereby to expand the fuel and further improve the efficiency of the powertrain 10D. Waste heat containing fluids 102 may include exhaust from the engine 50, exhaust from a fuel cell, coolant from a cooling system for an engine, fuel cell, electric motor, etc.

Although the power systems of FIGS. 1-4 form vehicle powertrains, it should be noted that stationary power systems may be employed within the scope of the claimed invention. For example, and within the scope of the claimed invention, a storage device configured to store compressed fuel may include a pressurized supply conduit from a utility or other source, and a chemical energy conversion system may include a fuel cell connected to a home or office for supplying electrical energy thereto, an electrical generating unit with a generator and an engine configured to run with compressed natural gas, etc.

While the best modes for carrying out the invention have been described in detail, those familiar with the art to which this invention relates will recognize various alternative designs and embodiments for practicing the invention within the scope of the appended claims.

The invention claimed is:

1. A power system comprising:
   a storage device configured to store pressurized fuel, said fuel being characterized by chemical energy and mechanical energy;
   an air motor having an air motor output member, being in fluid communication with the storage device, and being configured to transfer the mechanical energy of the fuel to the air motor output member;
   a chemical energy conversion system being in fluid communication with the air motor and being configured to convert the chemical energy of the fuel to another form of energy; and
   a first conduit defining a first passageway through which the storage device is in fluid communication with the air motor; and a heat exchanger in thermal communication with the first conduit.

2. The power system of claim 1, wherein said chemical energy conversion system includes a chemical energy conversion system output member; wherein the chemical energy conversion system is configured to convert the chemical energy of the fuel to mechanical energy and to transmit the mechanical energy converted from the chemical energy to the chemical energy conversion system output member.

3. The power system of claim 1, further comprising an electrical generator having a rotor; and wherein the air motor output member is operatively connected to the rotor.

4. The power system of claim 1, further comprising a second conduit defining a second passageway through which the chemical energy conversion system is in fluid communication with the heat exchanger.

5. A vehicle powertrain comprising:
   at least one ground-engaging traction device;
   a storage device configured to store pressurized fuel, said fuel being characterized by chemical energy and mechanical energy;
   an air motor having an air motor output member, being in fluid communication with the storage device, and being configured to transfer the mechanical energy of the fuel to the air motor output member; and
   a chemical energy conversion system having an energy conversion system output member, being in fluid communication with the air motor to receive fuel therefrom, and being configured to convert the chemical energy of the fuel to mechanical energy and to transmit the mechanical energy converted from chemical energy to the energy conversion system output member;

said energy conversion system output member being sufficiently operatively connected to said at least one ground-engaging traction device to transmit mechanical energy thereto;

said air motor output member being sufficiently operatively connected to said at least one ground-engaging traction device to transmit mechanical energy thereto; and a first conduit defining a first passageway through which the storage device is in fluid communication with the air motor; and a heat exchanger in thermal communication with the first conduit.

6. The vehicle powertrain of claim 5, further comprising a second conduit defining a second passageway through which the chemical energy conversion system is in fluid communication with the heat exchanger.

* * * * *